United States Patent
Matsumoto

(10) Patent No.: US 11,381,755 B2
(45) Date of Patent: Jul. 5, 2022

(54) IMAGE CAPTURE APPARATUS AND CONTROL METHOD FOR GENERATING A TIME-LAPSE MOVING IMAGE

(71) Applicant: CANON KABUSHIKI KAISHA, Tokyo (JP)

(72) Inventor: Yukihiro Matsumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/333,071

(22) Filed: May 28, 2021

(65) Prior Publication Data

US 2021/0377434 A1    Dec. 2, 2021

(30) Foreign Application Priority Data

Jun. 1, 2020 (JP) ............................. JP2020-095693

(51) Int. Cl.
*H04N 5/235* (2006.01)
*H04N 5/232* (2006.01)

(52) U.S. Cl.
CPC ....... *H04N 5/2353* (2013.01); *H04N 5/23229* (2013.01)

(58) Field of Classification Search
CPC ............. H04N 5/2353; H04N 5/23229; H04N 5/23245; H04N 5/2352; H04N 5/353
See application file for complete search history.

(56) References Cited

U.S. PATENT DOCUMENTS

| | | | | |
|---|---|---|---|---|
| 9,456,138 B2* | 9/2016 | Nishizaka | .......... | H04N 5/23245 |
| 9,560,270 B2* | 1/2017 | Ishihara | ............... | H04N 5/2356 |
| 10,313,549 B2* | 6/2019 | Guo | .................. | H04N 5/23251 |
| 10,623,656 B2* | 4/2020 | Noda | ..................... | H04N 5/232 |
| 2018/0234610 A1* | 8/2018 | Nakamura | ............. | H04N 5/772 |

FOREIGN PATENT DOCUMENTS

| JP | 2015-139029 A | 7/2015 |
|---|---|---|
| JP | 2015-142327 A | 8/2015 |

* cited by examiner

*Primary Examiner* — Luong T Nguyen
(74) *Attorney, Agent, or Firm* — Cowan, Liebowitz & Latman, P.C.

(57) ABSTRACT

An image capture apparatus comprises a photometry unit that acquires photometric information that indicates brightness of a captured image of a subject, a control unit that controls exposure based on the photometric information, and a correction unit that, at a time of acquiring a plurality of images, which are to be used when generating a time-lapse moving image and are obtained by consecutive image capturing of a subject, obtains a difference between first photometric information acquired prior to a first image capturing in the consecutive image capturing and second photometric information based on an image obtained by performing the first image capturing in a state in which exposure control has been performed, and corrects photometric information at the time of second and subsequent image capturing in the consecutive image capturing using the difference.

10 Claims, 5 Drawing Sheets

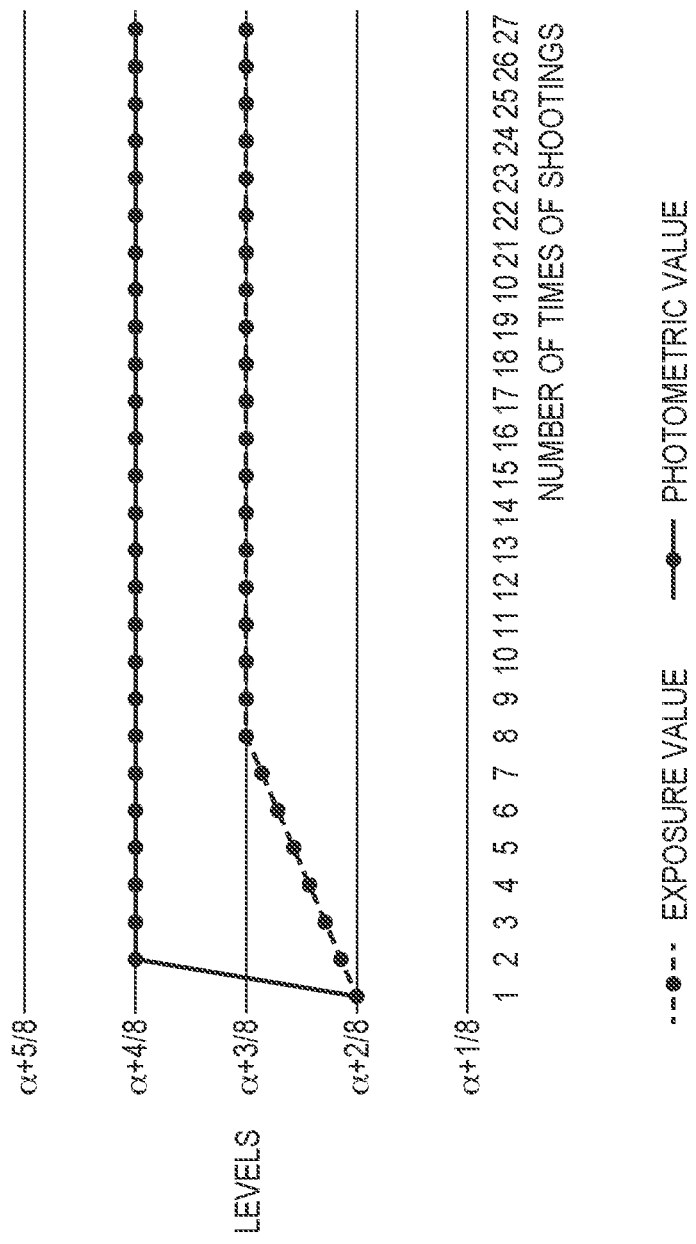

IMAGE CAPTURE APPARATUS AND CONTROL METHOD FOR GENERATING A TIME-LAPSE MOVING IMAGE

BACKGROUND OF THE INVENTION

Field of the Invention

The present invention relates to a technique for generating a time-lapse moving image, which is a plurality of images that have been joined.

Description of the Related Art

Conventionally, techniques for generating, by sequentially joining a plurality of images that were intermittently shot, a moving image (time-lapse moving image), in which a temporal change of a subject is compressed and recorded, are known.

Japanese Patent Laid-Open No. 2015-142327 describes a moving image-based interval shooting technique for generating a time-lapse moving image by reducing images from a set of moving images and then compressing the result. Japanese Patent Laid-Open No. 2015-139029 describes a technique for switching, in interval shooting, between automatic exposure shooting and fixed exposure shooting based on a difference between a photometric value at the time of starting shooting and a photometric value at the time of shooting thereafter.

Japanese Patent Laid-Open No. 2015-142327 extracts frame images at preset shooting intervals in a case of performing moving image-based interval shooting; however, regarding time-lapse moving images, frame images are shot at predetermined time intervals; accordingly, a shooting time that is several times or more longer than the duration of a time-lapse moving image to be generated becomes necessary. Therefore, in order to drive mechanisms, such as a diaphragm, during shooting, the mechanisms need to be highly durable. Accordingly, it is advantageous to fix the mechanisms, such as a diaphragm and a shutter, or move them as little as possible during shooting of images for generating a time-lapse moving image.

Also, in Japanese Patent Laid-Open No. 2015-139029, whether exposure control during shooting will be automatic exposure or fixed exposure is decided by a difference in luminance from the time of starting shooting; accordingly, it is unknown whether the exposure control will be as expected in the first place. In shooting images for generating a time-lapse moving image, to improve quality for when a plurality of images are viewed as a moving image, after exposure control involving driving of mechanisms, such as a diaphragm and a shutter, is performed at the time of a first shooting, the driving of the mechanisms, such as a diaphragm and a shutter, will not be performed in exposure control at the time of second and subsequent shootings. Accordingly, accuracy of a diaphragm and the like in the exposure control at the time of the first shooting will greatly affect the exposure control at the time of second and subsequent shootings.

SUMMARY OF THE INVENTION

The present invention has been made in consideration of the aforementioned problems, and realizes techniques that cause, in shooting of a time-lapse moving image, an error in exposure control at the time of a first shooting not to affect second and subsequent shootings.

In order to solve the aforementioned problems, the present invention provides an image capture apparatus comprising: a memory and at least one processor which function as: a photometry unit configured to acquire photometric information that indicates brightness of an image obtained by capturing a subject using an image sensor; a control unit configured to, when capturing a subject and outputting an image, control exposure based on the photometric information; and a correction unit configured to, at a time of acquiring a plurality of images, which are to be used when generating a time-lapse moving image and are obtained by consecutive image capturing of a subject using the image sensor, obtain a difference between first photometric information acquired prior to a first image capturing in the consecutive image capturing and second photometric information based on an image obtained by performing the first image capturing in a state in which exposure control has been performed by the control unit, and correct photometric information at the time of a second image capturing and a subsequent image capturing in the consecutive image capturing using the difference.

In order to solve the aforementioned problems, the present invention provides a method of controlling an image capture apparatus, the method comprising: acquiring photometric information that indicates brightness of an image obtained by capturing a subject using an image sensor; controlling, when capturing a subject and outputting an image, exposure based on the photometric information; and obtaining, at a time of acquiring a plurality of images, which are to be used when generating a time-lapse moving image and are obtained by consecutive image capturing of a subject using the image sensor, a difference between first photometric information acquired prior to a first image capturing in the consecutive image capturing and second photometric information based on an image obtained by performing the first image capturing in a state in which exposure control has been performed by the control unit, and correcting photometric information at the time of a second image capturing and a subsequent image capturing in the consecutive image capturing using the difference.

In order to solve the aforementioned problems, the present invention provides a non-transitory computer-readable storage medium storing a program for causing a computer to execute a method of controlling an image capture apparatus, the method comprising: acquiring photometric information that indicates brightness of an image obtained by capturing a subject using an image sensor; controlling, when capturing a subject and outputting an image, exposure based on the photometric information; and obtaining, at a time of acquiring a plurality of images, which are to be used when generating a time-lapse moving image and are obtained by consecutive image capturing of a subject using the image sensor, a difference between first photometric information acquired prior to a first image capturing in the consecutive image capturing and second photometric information based on an image obtained by performing the first image capturing in a state in which exposure control has been performed by the control unit, and correcting photometric information at the time of a second image capturing and a subsequent image capturing in the consecutive image capturing using the difference.

According to the present invention, it becomes possible to cause, in shooting of a time-lapse moving image, an error in exposure control at the time of the first shooting not to affect the second and subsequent shootings.

Further features of the present invention will become apparent from the following description of exemplary embodiments (with reference to the attached drawings).

BRIEF DESCRIPTION OF THE DRAWINGS

FIG. 5 is a view exemplifying a change in a photometric value and an exposure value at the time of conventional time-lapse moving image shooting.

DESCRIPTION OF THE EMBODIMENTS

Figure 1:
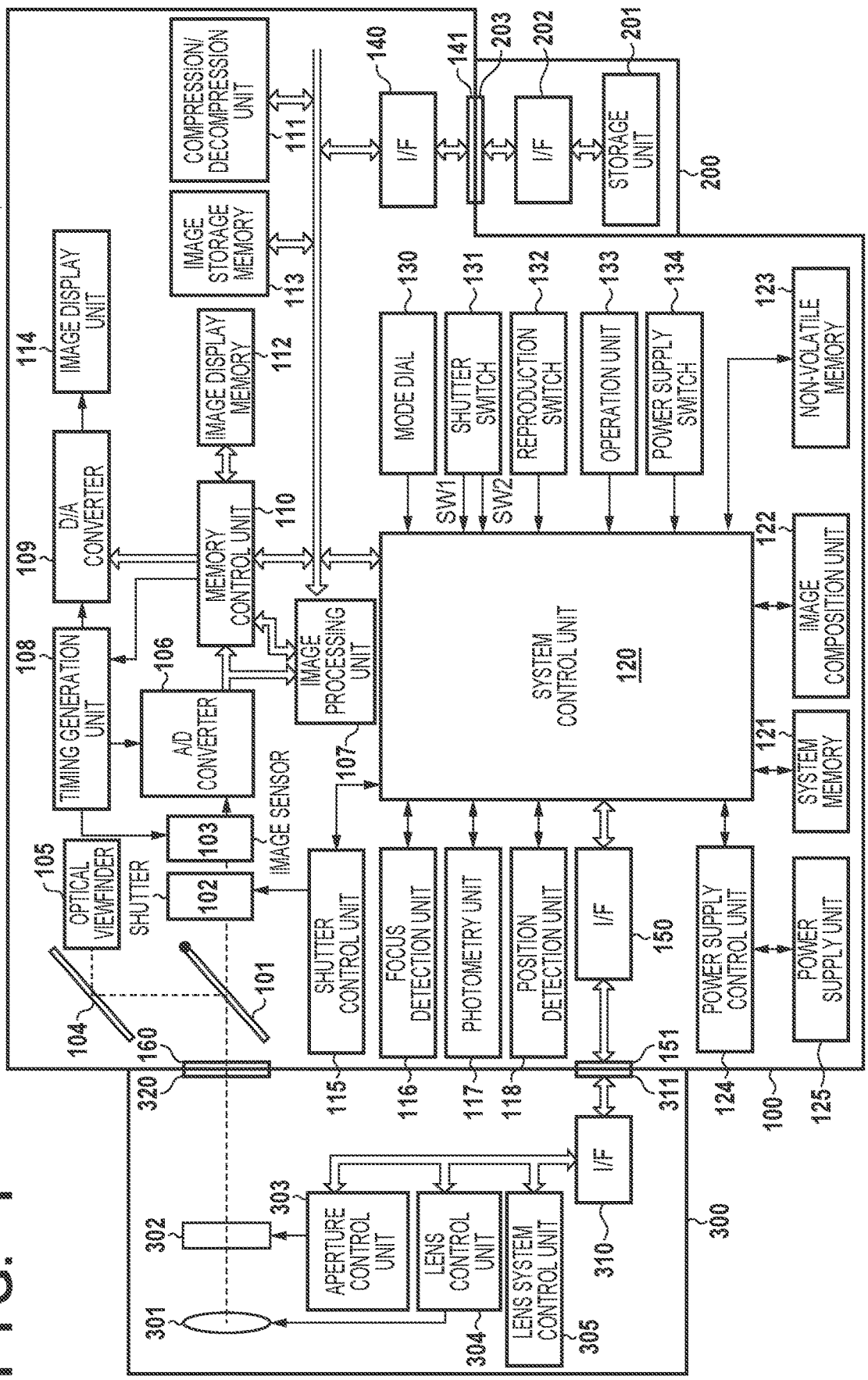
FIG. 1 is a block diagram illustrating a configuration of an apparatus of the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiments upon application of the present invention to an image capture apparatus such as a digital single-lens reflex camera capable of shooting a still image and/or moving image will be described in detail hereinafter with reference to the drawings.

<Apparatus Configuration>

First, a configuration and functions of a digital camera 1 of the present embodiment will be described with reference to FIG. 1.

As illustrated in FIG. 1, the digital camera 1 comprises a camera main body 100, a storage medium 200, and a lens unit 300. The storage medium 200 and the lens unit 300 are accessory devices that can be attached/detached in relation to the camera main body 100. The storage medium 200 is an external storage device such as a memory card or a hard disk. The lens unit 300 is an optical device that causes light of a subject to be incident on the camera main body 100. The lens unit 300 is attached onto a front surface of the camera main body 100 so that the camera main body 100 side and a shooting optical axis A coincide.

The storage medium 200 comprises a storage unit 201 configured by a semiconductor memory, a magnetic disk, or the like, a media interface 202 that performs transmission/reception of data to/from the camera main body 100, and a media connector 203 that electronically connects with the camera main body 100.

First, the configuration and functions of the camera main body 100 will be described.

A mirror 101 is positioned in a shooting optical path in the camera main body 100. The mirror 101 can be moved between a position at which light of the subject incident from an optical lens 301 is reflected toward a viewfinder optical system and a position at which the light of the subject incident from the optical lens 301 is moved out of the shooting optical path.

A pentagonal Dach prism 104 is an optical member that guides the light of the subject reflected by the mirror 101 to an optical viewfinder 105. A user can observe an image of the subject via the optical viewfinder 105.

The light of the subject that has passed the optical lens 301 and a diaphragm 302, in a state in which the mirror 101 is moved out of the shooting optical path (in a case where the mirror 101 is a half mirror, in a state in which the mirror 101 is positioned in the shooting optical path), passes a released focal plane shutter 102 and is made incident on an image sensor 103. The image sensor 103 is comprised of a charge-storage photoelectric conversion element, such as a CCD or a CMOS, and photo-electrically converts and then outputs, as an analog image signal, the incident light of the subject.

The optical viewfinder 105 is an optical member by which the user, by looking through it, can perform shooting without looking at images displayed on an image display unit 114, which serves as an electronic viewfinder (EVF).

An A/D converter 106 is a circuit that converts analog signals (image signal) outputted from the image sensor 103 into digital signals. A timing generation unit 108 is a circuit that supplies clock signals and control signals to the image sensor 103, the A/D converter 106, and a D/A converter 109 in accordance with control of a memory control unit 110 and a system control unit 120. Also, the timing generation unit 108, by controlling a reset timing of charges accumulated in the image sensor 103, can control operation of accumulating and discharging the charges in the image sensor 103.

An image processing unit 107 is a circuit that performs pixel interpolation processing and color conversion processing in relation to image data from the A/D converter 106 or image data from the memory control unit 110. Also, the image processing unit 107 performs predetermined computation processing using image data outputted from the A/D converter 106. The system control unit 120, based on this computation result, performs TTL autofocus (AF) processing, automatic exposure (AE) processing, and pre-flash (EF) processing.

Furthermore, the image processing unit 107 performs predetermined computation processing using image data outputted from the A/D converter 106 and, based on this computation result, performs TTL auto white balance (AWB) processing.

The memory control unit 110 is a circuit that controls the A/D converter 106, the timing generation unit 108, the image processing unit 107, an image display memory 112, the D/A converter 109, an image storage memory 113, and a compression/decompression unit 111. The image data outputted from the A/D converter 106 is written into the image display memory 112 or the image storage memory 113 via the image processing unit 107 and the memory control unit 110 or via only the memory control unit 110.

The image display unit 114 is a display device such as an LCD or an organic EL that displays images based on image signals converted into analog signals by the D/A converter 109 and then written into the image display memory 112. Regarding the image display unit 114, an electronic viewfinder (EVF) function is turned on or off based on control of the system control unit 120. Also, the image display unit 114 displays a menu screen and the like for the user to operate and input various kinds of settings, processing, and the like in relation to the camera main body 100.

The image storage memory 113 is a buffer memory that holds image data captured by the image sensor 103 and image data to be stored in the storage medium 200. Also, the image storage memory 113 is used as a working area of the system control unit 120. The image storage memory 113 comprises a storage capacity sufficient for storing a predetermined number of times of still images and a predetermined duration of moving images and audio. Note that the image storage memory 113 may serve as the memory (video memory) 112 for displaying images.

The compression/decompression unit 111 is a circuit that compresses or decompresses image data using a publicly known image compression method. The compression/decompression unit 111 reads the image data stored in the image storage memory 113, performs compression processing or decompression processing, and then writes the processed data into the image storage memory 113 again.

A shutter control unit 115 is a circuit that controls, based on photometric information (photometric value) detected in a photometry unit 117, the shutter speed of a shutter 102 while cooperating with an aperture control unit 303 of the lens unit 300.

A focus detection unit 116 is a circuit that detects, by a focus detection sensor (not shown), defocus information, which indicates an in-focus state of the image of the subject that has passed through the mirror 101 and was guided by a sub mirror (not shown), and then outputs the detection result to the system control unit 120. The photometry unit 117 is a circuit that detects, by a photometric sensor (not shown), photometric information, which indicates brightness of the image of the subject that has passed through the mirror 101 and was guided by a sub mirror (not shown), and then outputs the detection result to the system control unit 120.

Figure 2:
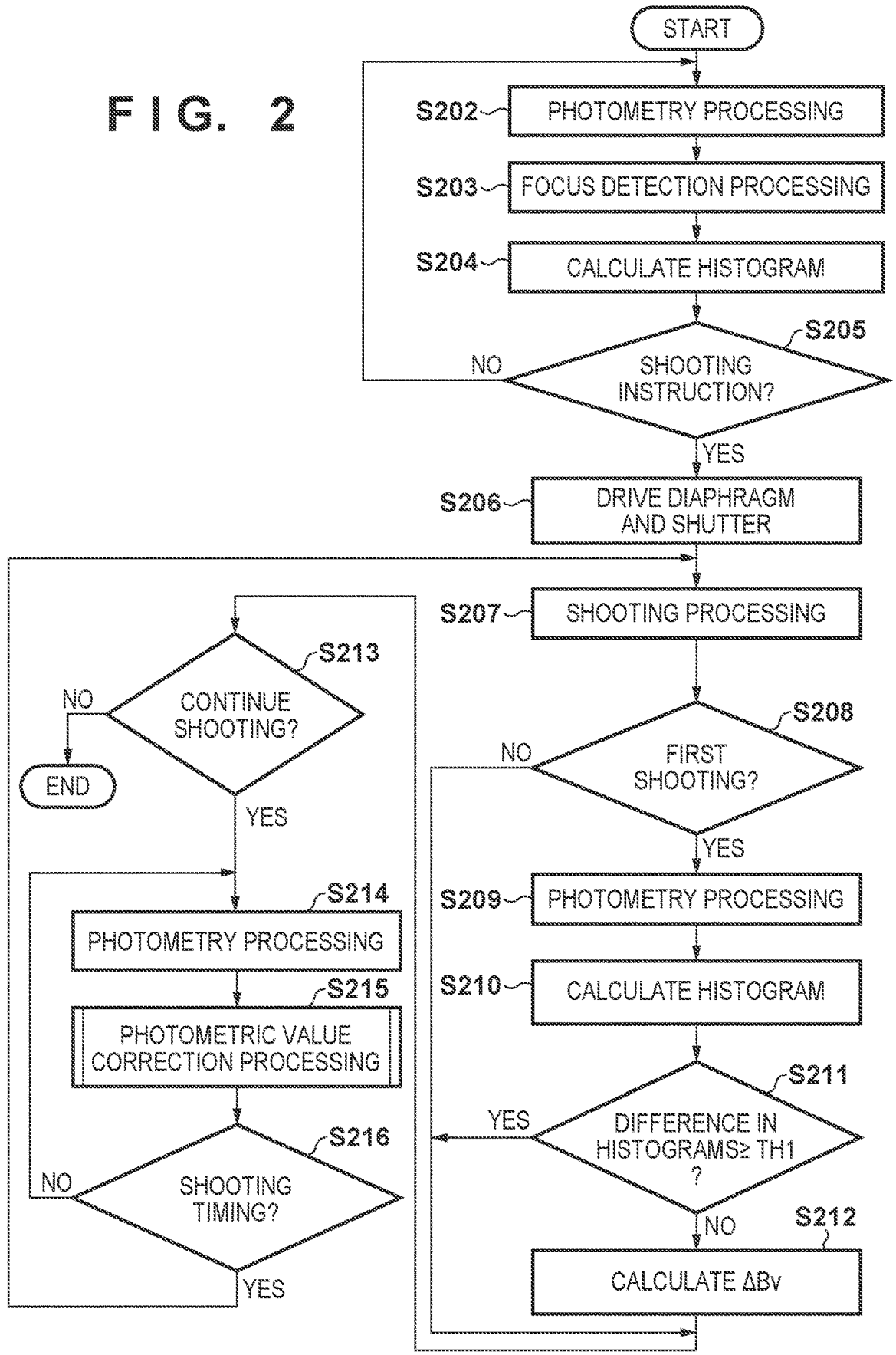
FIG. 2 is a flowchart illustrating time-lapse moving image shooting processing of the present embodiment.
Figure 3:
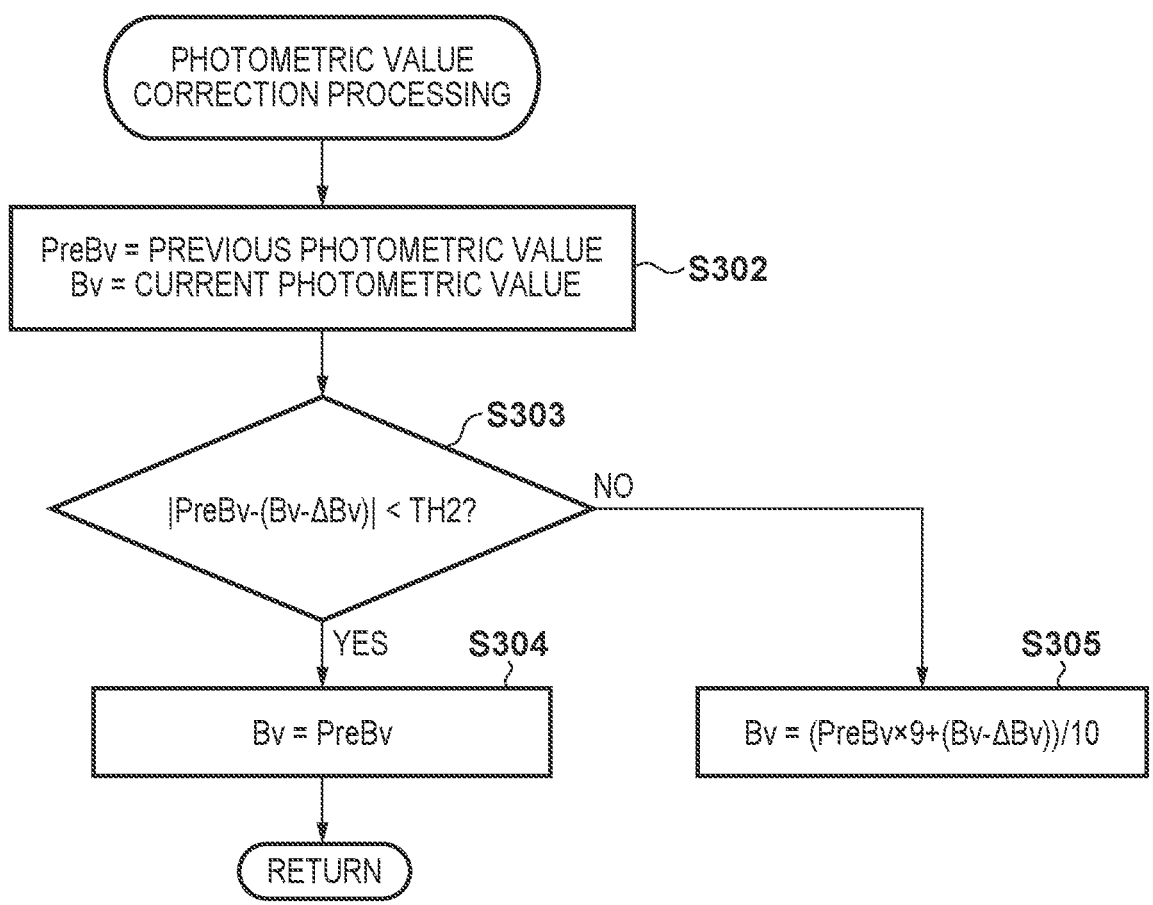
FIG. 3 is a flowchart illustrating photometric value correction processing in the time-lapse moving image shooting processing of FIG. 2.

The system control unit 120 is a microcomputer that comprehensively controls operation of the camera main body 100. In a system memory 121, constants, variables, software programs (basic programs), and the like for operating the system control unit 120 are stored. In the system memory 121, photometric values to be described later in FIG. 2 and FIG. 3 are also stored.

An image composition unit 122 is a circuit that generates, by joining, in the order of shooting, image data acquired by time-lapse moving image shooting, which will be described later, a moving image (time-lapse moving image), in which a temporal change has been compressed.

The system control unit 120 performs contrast or phase difference AF processing based on the defocus information of the focus detection unit 116 and performs AE processing based on the photometric value of the photometry unit 117.

A position detection unit 118 is a circuit that detects the position of the camera main body 100 by receiving GPS (Global Positioning System) signals and the like.

A non-volatile memory 123 is configured by an EEPROM, which can be electrically cleared/recorded, or the like, and is used as a memory for storing software programs and the like. In such a case, the software programs, of course, are stored in the non-volatile memory 123 so as to be computer readable. These software programs include software programs, which will be described later in FIG. 2 and FIG. 3, that the system control unit 120 can execute. In the non-volatile memory 123, a setting value set on a GUI screen of the menu screen and the like, a setting value set by operation of an operation unit 133, information of a shooting mode set by operation of a mode dial 130, and the like are stored.

The operation unit 133 is configured by operation members such as various switches, a button, and a touch panel that accept various operations from the user, a sight line detection device, or a speech recognition device, or a combination of these. The system control unit 120 performs various operations in accordance with signals from the operation unit 133.

A power supply switch 134 is an operation member for switching the power of the camera main body 100 on and off.

The power supply switch 134, in addition to switching the power supply to the camera main body 100 from a power supply unit 125 on and off, can switch, at the same time, the power supply to the storage medium 200 and the lens unit 300 that are connected to the camera main body 100 on and off.

A power supply control unit 124 is configured by a battery detection circuit, a DC-DC converter, a switch circuit that switches blocks to which power is supplied, and the like. The power supply control unit 124 performs detection of whether or not a battery is connected, the type of battery, and the remaining level of battery; controls the DC-DC converter in accordance with the detection result thereof and an instruction of the system control unit 120; and supplies a necessary voltage for a necessary period to each unit including the storage medium 200.

The power supply unit 125 is configured by a primary battery such as an alkaline battery or a lithium battery, a secondary battery such as an NiCd battery, an NiMH battery, or a lithium ion battery, an AC adapter, or the like.

The storage medium 200 is a memory card, a hard disk, or the like, and comprises the storage unit 201, the media interface 202, and the media connector 203. The storage unit 201 is configured by a semiconductor memory, a magnetic disk, or the like. The media interface 202 and the media connector 203 electrically connect the storage medium 200 with the camera main body 100. The media interface 202 and the media connector 203 enable writing of data to the storage medium 200 and reading of data from the storage medium 200 via a first camera interface 140 and a first camera connector 141 provided in the camera main body 100.

The system control unit 120 calculates an exposure value Ev at which the brightness of the subject is the optimum from, for example, a combination of a photometric value Bv and an ISO sensitivity Sv of the photometry unit 117 and then calculates an aperture value Av related to the opening rate of the diaphragm 302 and a charge accumulation time of the image sensor 103, which corresponds to a shutter speed Tv, from the calculated exposure value Ev.

Also, the system control unit 120 has a clocking function that uses a system clock (not shown) or the like and manages time information, such as shooting intervals and current time, from time information that the user set by operating the operation unit 133.

Note that in the non-volatile memory 123, information (a program chart by table data or the like) that relates to exposure (proper exposure) related to a photometric value of a shot image (a luminance value of the subject) is stored in advance. The system control unit 120, from the exposure value Ev and the program chart calculated from a combination of the photometric value Bv and the ISO sensitivity Sv of the photometry unit 117, performs AE processing, which determines the aperture value Av and the shutter speed Tv for controlling to a proper exposure.

Also, the system control unit 120, at the time of shooting a time-lapse moving image, which will be described later, executes various kinds of control related to generation of the time-lapse moving image. Details of time-lapse moving image shooting processing will be described later.

The mode dial 130, a shutter release switch 131, and a reproduction switch 132, similarly to the operation unit 133, are configured by operation members such as various switches, buttons, and a touch panel that accept various operations from the user, a sight line detection device, or a speech recognition device, or a combination of these.

The mode dial 130 is an operation member that is used when the user selects a desired shooting mode from among a plurality of shooting modes that can be set on the digital camera 1.

In the present embodiment, either a normal moving image mode or a time-lapse moving image mode can be set as the moving image shooting mode.

Note that the digital camera 1 can be set not only to the moving image shooting mode but also to a still image shooting mode.

The normal moving image mode is a mode that displays or records by sequentially joining a plurality of pieces of image data acquired by consecutively executing charge accumulation (image capturing) in the image sensor 103.

The time-lapse moving image mode is a mode that determines image data (hereinafter, proper image) for a time-lapse moving image based on preset shooting intervals (intervals) from among a plurality of pieces of image data acquired by consecutively executing image capturing in the image sensor 103. In the time-lapse moving image mode, it is possible to display or record by joining, in the order of acquisition (order of shooting), proper images with each other.

Also, regarding moving images shot in the normal moving image mode, the shooting time of a moving image and the reproduction time of the moving image approximately coincide; however, regarding time-lapse moving images, the shooting time of a time-lapse moving image and the reproduction time of the time-lapse moving image are different.

Time-lapse moving images are generated by intermittently joining image data in a predetermined period (total shooting time); accordingly, in relation to the total shooting time (from the start to the end of shooting) for generating one time-lapse moving image, the reproduction time of the time-lapse moving image will be shorter. Also, considering the durability of the mechanisms, it is advantageous to not operate the diaphragm and the focus lens for performing the AE processing and AF processing at the time of shooting time-lapse moving images; accordingly, the mechanisms, during shooting of time-lapse moving images, are fixed in a state at the time of a first image shooting.

Note that the digital camera 1 of the present embodiment, in the still image mode and the moving image mode described above, can be further set to a plurality of modes in the following.

For example, an automatic mode, a program mode, a shutter speed priority mode, an aperture priority mode, a manual mode, a focal depth priority mode, a portrait mode, a scenery mode, a close-up mode, a sports mode, and a nightscape mode.

The shutter release switch 131 is an operation member used for instructing to start a shooting preparation operation or a shooting operation.

A first shutter release switch signal SW1 is turned on by a first stroke (e.g., a half press) of the shutter release switch 131. When the first shutter release switch signal SW1 is turned on, the shooting preparation operation is started, and the system control unit 120 starts the AF processing, the AE processing, the AWB processing, the EF processing, and the like.

Also, a second shutter release switch signal SW2 is turned on by a second stroke (e.g., a full press) of the shutter release switch 131. When the second shutter release switch signal SW2 is turned on, the shooting operation is started, and the system control unit 120 starts exposure processing and recording processing related to charge accumulation (image capturing) by the image sensor 103.

In the exposure processing a signal read out from the image sensor 103 is written into the image storage memory 113 as image data via the A/D converter 106 and the memory control unit 110 in accordance with an instruction from the system control unit 120.

Also, in accordance with an instruction from the system control unit 120, developing processing is executed in relation to the image data based on various calculations in the image processing unit 107 and the memory control unit 110, and then the developed image data is written into the image storage memory 113.

In the recording processing, developed image data read out from the image storage memory 113 is compressed by the compression/decompression unit 111 in accordance with an instruction from the system control unit 120. Then, compressed image data is written into the storage unit 201 of the storage medium 200 via a camera interface 140, a camera connector 141, the media connector 203, and the media interface 202 in accordance with an instruction from the system control unit 120.

The reproduction switch 132 is an operation member that instructs the start of reproduction processing, which displays image data stored in the image storage memory 113 or image data read out from the storage medium 200 on the image display unit 114.

The operation unit 133 is an operation member that is used for various settings related to menu displaying and shooting and various settings related to reproduction.

Note that the total shooting time configured by shooting intervals of images at the time of shooting a time-lapse moving image, the number of times of shootings, and the like can be set by the user operating the operation unit 133.

Also, various types of control, such as a method of fixing a camera and then shooting and a method of shooting while moving by carrying a camera, such as a walking lapse, are provided in time-lapse moving image shooting.

A second camera interface 150 and a second camera connector 151 electrically connect the camera main body 100 with the lens unit 300. The second camera interface 150 and the second camera connector 151 enables communication between the system control unit 120 and a lens system control unit 305 of the lens unit 300 via a lens interface 310 provided in the lens unit 300 and a lens connector 311. Also, the second camera interface 150 and the second camera connector 151 can communicate control signals, status signals, data signals, and the like between the camera main body 100 and the lens unit 300 and supply predetermined voltages and current. Note that regarding the second camera interface 150 and the second camera connector 151, not only electrical communication but also optical communication, audio communication, and the like may be possible.

Next, a configuration and functions of the lens unit 300 will be described.

The lens unit 300 comprises the optical lens 301, the diaphragm 302, the aperture control unit 303, a lens control unit 304, the lens system control unit 305, the lens interface (I/F) 310, the lens connector 311, and a lens mount 320.

The optical lens 301 is an optical member that includes a focus lens, a zoom lens, a shift lens, and the like.

The diaphragm 302 is a light amount adjustment member that adjusts the amount of light of the subject that passed the optical lens 301 and will be incident on the image sensor 103.

The aperture control unit 303 is a circuit that controls the opening amount of the diaphragm 302 in accordance with an instruction from the system control unit 120. The system control unit 120, by transmitting an instruction to the aperture control unit 303 based on the photometric value of the photometry unit 117, changes the aperture diameter of the diaphragm 302 so as to take on the opening amount that corresponds to a target aperture value. The aperture diameter of the diaphragm 302 during a change is consecutively detected by communication between the lens unit 300 and the camera main body 100. The system control unit 120 ends the change of the aperture diameter of the diaphragm 302 in accordance with the aperture diameter of the diaphragm 302 reaching the aperture diameter that corresponds to the target aperture value.

The lens control unit 304 is a circuit that controls operation (driving) of the optical lens 301. The lens control unit 304 can detect a focus lens position (focus position), and information related to the detected lens position is transmitted to the system control unit 120 of the camera main body 100.

The aperture control unit 303 and the lens control unit 304, when the shooting mode of the digital camera 1 is set to the time-lapse moving image mode, controls operation of the diaphragm 302 and the optical lens 301 so as to be fixed at an aperture value and a focus position when a proper image was acquired in the first shooting.

The lens system control unit 305 is a microcomputer that comprehensively controls the lens unit 300. The lens system control unit 305 contains a CPU (not shown), a volatile memory, and a non-volatile memory, and in the volatile memory, constants, variables, programs, and the like for operation are stored. In the non-volatile memory, identification information such as a unique number related to the lens unit 300, management information, and function information such as the maximum aperture value, the minimum aperture value, focal length, and the like are stored.

The lens mount 320 is a member for mechanically coupling the lens unit 300 to the camera main body 100, and the lens mount 320 and a camera mount 160 of the camera main body 100 have a form, such as a flange and the like, enabling to couple together. By the lens mount 320 and the camera mount 160 coupling, the lens unit 300 is connected to the camera main body 100.

The lens interface 310 and the lens connector 311 electrically connect the lens unit 300 with the camera main body 100. The lens interface 310 and the lens connector 311 enable communication between the lens system control unit 305 and the system control unit 120 of the camera main body 100 via the second camera interface 150 and the second camera connector 151 provided in the camera main body 100. Also, the lens interface 310 and the lens connector 311 can communicate control signals, status signals, data signals, and the like between the camera main body 100 and the lens unit 300 and supply predetermined voltages and current. Note that regarding the lens interface 310 and the lens connector 311, not only electrical communication but also optical communication, audio communication, and the like may be possible.

Note that the components illustrated in FIG. 1 may be achieved by hardware such as an ASIC or a programmable logic array (PLA) or may be achieved by a programmable processor, such as a CPU or an MPU, executing software. A combination of software and hardware may be used for the implementation.

In the present embodiment, even in a case where different components are described as operating agents, the same hardware may be used as operating agents for the implementation. Note that the digital camera 1 of the present embodiment is an interchangeable-lens image capture apparatus that comprises the camera main body 100, the storage medium 200, and the lens unit 300; however, the present invention is not limited to this. For example, configuration may be such that the camera main body 100 and the lens unit 300 are integrally provided or configuration may be such that the optical viewfinder 105 is not comprised.

<Time-Lapse Moving Image Shooting Processing>

Next, time-lapse moving image shooting processing by the digital camera 1 of the present embodiment will be described.

FIG. 2 and FIG. 3 are flowcharts illustrating time-lapse moving image shooting processing of the present embodiment.

Note that the processing of FIG. 2 and FIG. 3 are achieved by the system control unit 120 controlling each component by executing programs stored in the non-volatile memory 123. Also, the processing of FIG. 2 is started in a case where the shooting mode is set to the time-lapse moving image mode by a user operation and is in a shooting standby state.

In step S202, the system control unit 120 causes the photometry unit 117 to execute photometric processing of a live view image at predetermined intervals, store the photometric result as a photometric value Bv1 (a first photometric value) in the system memory 121, and then calculate an exposure value Ev based on the photometric value Bv1.

In step S203, the system control unit 120 causes the focus detection unit 116 to repeatedly execute focus detection processing (distance measurement processing).

In step S204, the system control unit 120 causes the image processing unit 107 to calculate a histogram that represents the luminance distribution of live view images using image signals captured by the image sensor 103 and then stores the calculation result as a histogram 1 (a first histogram) in the system memory 121.

In step S205, the system control unit 120 determines whether the shutter release switch 131 was operated and then an instruction to shoot a time-lapse moving image was accepted. The system control unit 120, in a case where it is determined in step S205 that an instruction to shoot a time-lapse moving image was accepted, advances the processing to step S206, and in a case where it is determined that an instruction to shoot a time-lapse moving image was not accepted, returns the processing to step S202.

In step S206, the system control unit 120 drives the diaphragm 302 by controlling the aperture control unit 303 in accordance with the exposure value Ev calculated based on the photometric value Bv1 calculated in step S202 and performs driving of the optical lens 301 by controlling the lens control unit 304.

In step S207, the system control unit 120 executes first image shooting processing for generating a time-lapse moving image by controlling a charge accumulation operation of the image sensor 103 by the timing generation unit 108.

In step S208, the system control unit 120 determines whether or not the shooting processing in step S208 is the first image shooting. The system control unit 120, in a case where it is determined that it is the first image shooting, advances the processing to step S209, and in a case where it is determined that it is not the first image shooting, advances the processing to step 213.

In step S209, the system control unit 120 causes the photometry unit 117 to execute the photometric processing in relation to the first image signal shot in step S207 and then stores the photometric result as a photometric value Bv2 (a second photometric value) in the system memory 121.

In step S210, the system control unit 120 causes the image processing unit 107 to calculate a histogram that represents the luminance distribution of the first image shot in step S207 and then stores the calculation result as a histogram 2 (a second histogram) in the system memory 121.

In step S211, the system control unit 120 compares the histogram 1 of the live view images calculated in step S204 and the histogram 2 of images of the first shooting calculated in step S210 and then determines whether or not the difference between the histogram 1 and the histogram 2 is a predetermined first threshold TH1 or more. The system control unit 120, in a case where it is determined that there is a difference of the predetermined first threshold TH1 or more between the histogram 1 and the histogram 2, determines that the luminance distribution changed due to an angle of view or a subject moving during shooting or the like and then advances the processing to step S213, and in a case where it is determined that there is no difference of the predetermined first threshold TH1 or more between the histogram 1 and the histogram 2, advances the processing to step S212.

In step S212, the system control unit 120 calculates a difference $\Delta Bv$ (=Bv1−Bv2) between the photometric value Bv1 of the images before the first shooting acquired in step S202 and the photometric value Bv2 of the images during the first shooting acquired in step S209, and then stores the difference $\Delta Bv$, which is the calculation result, in the system memory 121. In a case where there is no error in the opening rate due to the driving of the diaphragm 302 in step S206, it should be the same as the photometric value Bv1 in step S202; however, in a case where there is an error in the opening rate due to the driving of the diaphragm 302 in step S206, a difference due to that error will occur as a difference in the photometric result. In step S212, it is estimated whether or not the diaphragm was properly driven in accordance with the driving instruction by performing a calculation of the difference $\Delta Bv$, and configuration is such that the diaphragm is not driven unintentionally by an influence of disturbances such as crossing of a subject.

In step S213, the system control unit 120 determines whether or not to continue the time-lapse moving image shooting and in a case where it is determined to continue the time-lapse moving image shooting, advances the processing to step S214, and in a case where it is determined to end the time-lapse moving image shooting, determines that all of the time-lapse moving image shooting has been performed, ends the time-lapse moving image shooting, and transitions to the shooting standby state.

In step S214, the system control unit 120, similarly to step S202, causes the photometry unit 117 to execute the photometric processing of a live view image at predetermined intervals and then stores the photometric result as a photometric value Bv3 (a third photometric value) in the system memory 121.

In step S215, the system control unit 120 calculates the exposure value Ev based on the photometric value Bv3 acquired in step S214 and then stores the result in the system memory 121.

In step S216, the system control unit 120 performs determination of a shooting timing. The system control unit 120, in a case where it is determined that it is not a shooting timing, returns the processing to step S214, and in a case where it is determined that it is a shooting timing, returns the processing to step S207 and then performs second image shooting processing based on the exposure value Ev calculated in step S215.

In step S217, the system control unit 120 determines that all of the time-lapse moving image shooting has been performed, ends the time-lapse moving image shooting, and then transitions to the shooting standby state.

FIG. 3 is a flowchart illustrating the photometric value correction processing in step S215 of FIG. 2.

In step S302, the system control unit 120 obtains an absolute value of a difference between the photometric value PreBv at the time of the previous shooting and a value (Bv−$\Delta Bv$), which is the difference $\Delta Bv$ between the photometric value Bv1 and the photometric value Bv2 subtracted from the photometric value Bv3 acquired in step S214.

In step S303, the system control unit 120 determines whether or not the absolute value of the difference obtained in step S302 is less than a predetermined second threshold TH2 and in a case where it is determined that it is less than the predetermined second threshold TH2, advances the processing to step S304, and in a case where it is determined that it is the predetermined second threshold TH2 or more, advances the processing to step S305.

In step S304, the system control unit 120 determines that the photometric value Bv at the time of the current shooting has not greatly changed from the photometric value PreBv at the time of the previous shooting and then sets the photometric value PreBv at the time of the previous shooting as the photometric value Bv at the time of the current shooting.

In step S305, the system control unit 120 determines that the photometric value Bv at the time of the current shooting has greatly changed from the photometric value PreBv at the time of the previous shooting and then sets a value calculated by weight averaging using the photometric value PreBv at the time of the previous shooting, the photometric value Bv at the time of the current shooting, and the difference $\Delta Bv$ obtained in step S209 as the photometric value Bv at the time of the current shooting.

Figure 4:
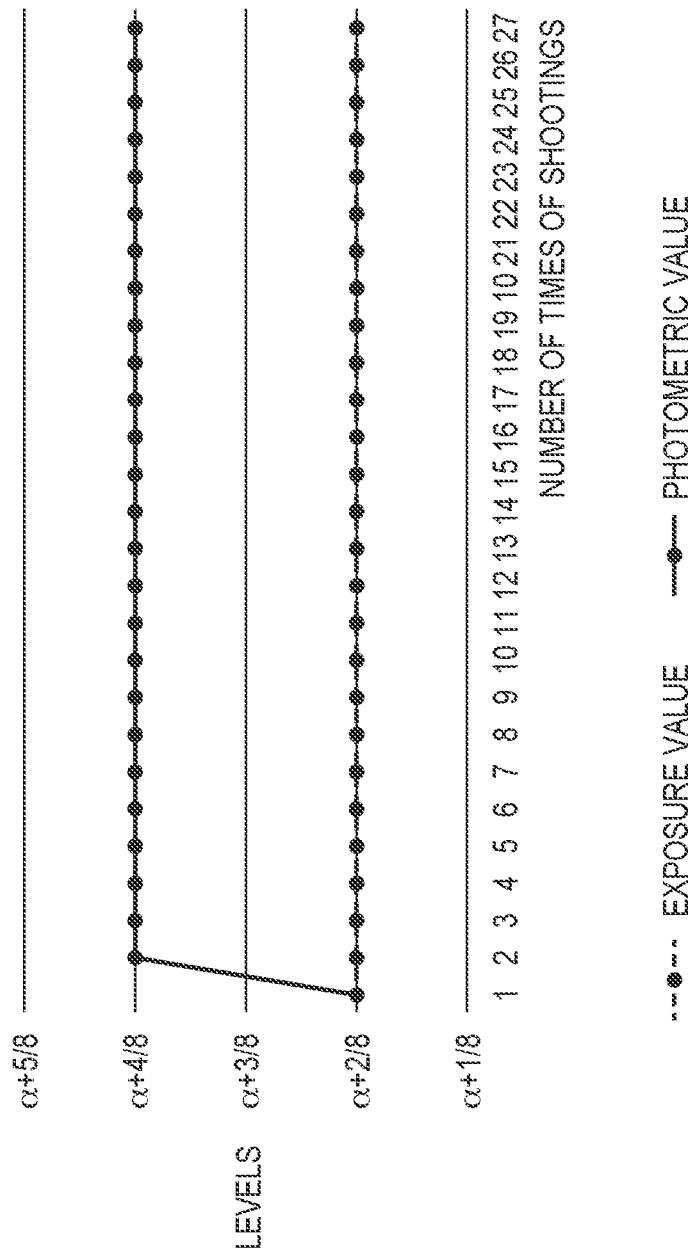
FIG. 4 is a view exemplifying a change in a photometric value and an exposure value of the present embodiment at the time of time-lapse moving image shooting.

As described above, in a case where the photometric value Bv at the time of the current shooting has greatly changed from the photometric value PreBv at the time of the previous shooting, the photometric value Bv at the time of the current shooting is corrected using the photometric value PreBv at the time of the previous shooting and the difference $\Delta Bv$ between the photometric value Bv1 prior to the previous shooting and the photometric value Bv2 at the time of the previous shooting. By this, even in a case where there was an error when controlling the diaphragm 302 at the time of shooting, the amount of that error is removed from the photometric value at the time of second and subsequent shootings in a case where the subject of the same brightness is being shot; accordingly, as illustrated in FIG. 4, it becomes less likely for a change in the photometric value during shooting to occur. In contrast to this, conventionally, in a case where the photometric value Bv at the time of the current shooting has greatly changed from the photometric value PreBv at the time of the previous shooting, a photometric value calculated from the photometric value PreBv at the time of the previous shooting and the photometric value Bv at the time of current shooting was set as the photometric value at the time of the current shooting; accordingly, if there is an error at the time of controlling aperture, that error will be an error in the second and subsequent photometric values even when shooting a subject of the same brightness, and a change in exposure as illustrated in FIG. 5 will occur.

By virtue of the present embodiment, in the case of a configuration to, at the time of shooting a time-lapse moving image, after having performed driving of the diaphragm at the time of a first shooting, not perform driving of the diaphragm at the time of the second and subsequent shootings, by eliminating the impact of an error that occurred when controlling the diaphragm at the time of the first shooting on the second and subsequent shootings, it becomes possible to perform time-lapse moving image shooting at a good exposure.

Note that driving of the diaphragm 302 was performed only at the time of the first image shooting (at the time of starting shooting) in the present embodiment; however, configuration may be taken such that, for example, the diaphragm 302 is driven during time-lapse moving image shooting only in a case where time-lapse moving image shooting can no longer be executed at a proper exposure due to the diaphragm 302 being fixed. In such a case, when the diaphragm 302 is driven, the same computation as that of before and after the first shooting is performed.

Also, in step S211, it is switched whether or not to perform computation of ΔBv from a difference between the histogram 1 and the histogram 2; however, configuration may be taken such that in a case where, for example, ΔBv and a threshold of the photometric value that accords with the amount of driving of the diaphragm are compared, and ΔBv has changed by the threshold of the photometric value that accords with the amount of driving of the diaphragm or more, correction of the photometric value using ΔBv is not performed at the time of the second and subsequent shootings, and ΔBv is set to 0 in step S212.

Note that the above various kinds of control described to be performed by the system control unit 120 may be performed by one piece of hardware or control of the entire apparatus may be performed by a plurality of pieces of hardware sharing processing.

In addition, although the present invention was explained in detail based on suitable embodiments, the present invention is not limited to these specific embodiments, and various forms of a scope that does not deviate from the gist of this invention are included in the invention. Each of the above-described exemplary embodiments is to be considered as an exemplary embodiment of the present invention.

Also, in the above-described exemplary embodiments, description was made using, as an example, a case where the present invention was applied to a digital interchangeable-lens camera; however, the present invention is not limited to this and may be applied so long as the apparatus has a time-lapse moving image shooting function. In other words, the present invention can be applied to digital non-interchangeable-lens cameras, digital video cameras, personal computers, tablets which are a kind of a personal computer, mobile phones, smartphones which are a kind of a mobile phone, wristwatch-type smart watches, wearable computers such as spectacle-type smart glasses, surveillance cameras, in-vehicle cameras, medical cameras, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-095693, filed Jun. 1, 2020 which is hereby incorporated by reference herein in its entirety.

What is claimed is:

1. An image capture apparatus comprising:
a memory and at least one processor which function as:
a photometry unit configured to acquire photometric information that indicates brightness of an image obtained by capturing a subject using an image sensor;
a control unit configured to, when capturing the subject and outputting the image, control exposure based on the photometric information; and
a correction unit configured to, at a time of acquiring a plurality of images, which are to be used when generating a time-lapse moving image and are obtained by consecutive image capturing of the subject using the image sensor, obtain a difference between first photometric information acquired prior to a first image capturing in the consecutive image capturing and second photometric information based on an image obtained by performing the first image capturing in a state in which exposure control has been performed by the control unit, and correct third photometric information at the time of a second image capturing and a subsequent image capturing in the consecutive image capturing using the difference.

2. The apparatus according to claim 1, wherein
the exposure control includes diaphragm driving control, and
in a case where a diaphragm is driven at the time of the first image capturing, the correction unit corrects the third photometric information at the time of the second image capturing and the subsequent image capturing using the difference between the first photometric information and the second photometric information.

3. The apparatus according to claim 2, wherein
the correction unit, in a case where a difference between a first histogram that represents a luminance distribution of an image prior to the first image capturing and a second histogram that represents a luminance distribution of an image at the time of the first image capturing is less than a predetermined first threshold, corrects a photometric result at the time of the second image capturing and the subsequent image capturing.

4. The apparatus according to claim 3, wherein
the correction unit obtains, at the time of the second image capturing and the subsequent image capturing, an absolute value of a differential between photometric information acquired from an image at the time of a previous image capturing and a value, which is the difference subtracted from photometric information acquired prior to a current image capturing, and
in a case where the absolute value is less than a predetermined second threshold, sets photometric information at the time of a current image capturing to photometric information at the time of a previous image capturing, and in a case where the absolute value is the predetermined second threshold or more, corrects the photometric information at the time of the current image capturing using the photometric information at the time of the previous image capturing and the value that is the result of a subtraction.

5. The apparatus according to claim 4, wherein
the correction unit, in a case where the absolute value is the predetermined second threshold or more, obtains the photometric information at the time of the current image capturing by weight averaging of the photometric information at the time of the current image capturing and the value that is the result of the subtraction.

6. The apparatus according to claim 1, wherein
the exposure control includes driving control of a diaphragm, and
the correction unit, at the time of the first image capturing, obtains a difference between photometric information acquired prior to driving of the diaphragm and photometric information acquired after driving of the diaphragm, and in a case where the difference is a threshold, which is the photometric information that accords with an amount of driving of the diaphragm, or more, does not perform correction of the third photometric information at the time of the second image capturing and the subsequent image capturing based on the difference.

7. The apparatus according to claim 1, wherein
the exposure control includes driving control of a diaphragm, and
in a case where the diaphragm is driven not only at the time of the first shooting but also at the time of the second image capturing and the subsequent image capturing, the correction unit obtains a difference between photometric information acquired prior to driving of the diaphragm and photometric information acquired after driving of the diaphragm, and corrects the third photometric information at the time of the second image capturing and the subsequent image capturing based on the difference.

8. The apparatus according to claim 1, wherein the at least one processor functions as
a generation unit configured to generate the time-lapse moving image, which is a plurality of images obtained by the consecutive image capturing that have been joined,
wherein a shooting time is longer than a reproduction time for the time-lapse moving image according to an interval between respective image capturing in the consecutive image capturing set in advance.

9. A method of controlling an image capture apparatus, the method comprising:
acquiring photometric information that indicates brightness of an image obtained by capturing a subject using an image sensor;
controlling, when capturing the subject and outputting the image, exposure based on the photometric information; and
obtaining, at a time of acquiring a plurality of images, which are to be used when generating a time-lapse moving image and are obtained by consecutive image capturing of the subject using the image sensor, a difference between first photometric information acquired prior to a first image capturing in the consecutive image capturing and second photometric information based on an image obtained by performing the first image capturing in a state in which exposure control has been performed by the control unit, and correcting third photometric information at the time of a second image capturing and a subsequent image capturing in the consecutive image capturing using the difference.

10. A non-transitory computer-readable storage medium storing a program for causing a computer to execute a method of controlling an image capture apparatus, the method comprising:
acquiring photometric information that indicates brightness of an image obtained by capturing a subject using an image sensor;
controlling, when capturing the subject and outputting the image, exposure based on the photometric information; and
obtaining, at a time of acquiring a plurality of images, which are to be used when generating a time-lapse moving image and are obtained by consecutive image capturing of the subject using the image sensor, a difference between first photometric information acquired prior to a first image capturing in the consecutive image capturing and second photometric information based on an image obtained by performing the first image capturing in a state in which exposure control has been performed by the control unit, and correcting third photometric information at the time of a second image capturing and a subsequent image capturing in the consecutive image capturing using the difference.

* * * * *